March 15, 1960 S. A. KELNHOFER 2,928,905

CONTROL SYSTEM FOR PARALLEL-COUPLED COMMUNICATION STATIONS

Filed May 5, 1958 2 Sheets-Sheet 1

INVENTOR.
SYLVESTER A. KELNHOFER

BY

AGENT

March 15, 1960 S. A. KELNHOFER 2,928,905

CONTROL SYSTEM FOR PARALLEL-COUPLED COMMUNICATION STATIONS

Filed May 5, 1958 2 Sheets-Sheet 2

2,928,905

CONTROL SYSTEM FOR PARALLEL-COUPLED COMMUNICATION STATIONS

Sylvester A. Kelnhofer, Webster, N.Y., assignor to General Dynamics Corporation, Rochester, N.Y., a corporation of Delaware Application May 5, 1958, Serial No. 733,108

13 Claims. (Cl. 179—33)

My invention relates generally to communication systems wherein stations for receiving or transmitting signals to or from a common point are coupled by a common channel to that point and in parallel to each other, and more particularly to telephone systems wherein a plurality of stations are connected to an office and in parallel with each other by a land wire line.

It is the practice to provide a plurality of stations connected to a common line or channel where attempts to establish connections to an office may be made from two or more stations at the same time. The resulting conflict of supervisory, directive, and other signals transmitted or received at the stations and office may prevent the office equipment from functioning properly. In the past, attempts have been made to restrict the use of the line or channel to one station at a time, usually with the object of preventing eavesdropping by party line subscribers. In such systems, each station is equipped with apparatus responsive to the operation of line seizing means within the station for transmitting local signals to other stations on the same line. Each station also includes other apparatus responsive to such local signals for preventing the operation of the signal transmitting or receiving means and the line seizing means. Such apparatus has been electromechanical in nature, and therefore expensive. Further, conventional subscriber telephone stations draw their energy from a battery located at the central office, and have apparatus for generating direct current supervisory and directive signals to be transmitted over the line conductors. This complicates the design of electromechanical apparatus for generating and receiving local signals because such local signals must be non-interfering with the signals generated for transmission to the central office.

In the case of telephone stations for use in systems employing alternating current signaling exclusively, such as the one shown and described in the copending application of Stern et al., Serial No. 761,045 filed September 15, 1958 and assigned to the same assignee as the present invention, the removal of the necessity for direct current potential on the line conductors opens up a series of hitherto impossible solutions for achieving interstation signaling and station restriction.

Accordingly, it is an object of my invention to provide a new and improved signaling system.

Another object of my invention is to provide a new and improved signaling system for use with parallel-coupled communication stations.

Another object of my invention is to provide a new and improved system for preventing more than one of a plurality of parallel-coupled communication stations from being used at any one time.

Another object of my invention is to provide a new and improved signaling system for use with telephone stations connected to a common line.

Another object of my invention is to provide a new and and improved system for preventing more than one of a plurality of stations on a telephone line from being used at the same time.

Another object of my invention is to provide a new and improved system for disabling all stations connected to a telephone line other than the first used of such stations until such first-used station is hung up.

I accomplish these together with other objects and advantages in a communication system having a plurality of stations and a line, where each station includes means, such as a microphone and receiving unit (usually carried in a handset), for translating acoustical signals into electrical signals and vice versa, as well as means coupled to the line for translating mechanical motions on the part of the user of the station into directive electrical signals. Each station also includes means such as a conventional hookswitch mechanism having contact sets operative in the conventional sense for making the signal translating means operative when the handset is removed from its cradle. Means including the hookswitch mechanism is operative in response to the removal of the handset from its cradle for generating a control signal to be employed in the manner set forth below.

In order to control the operation of the aforementioned signal translating means, I provide at each station means having an output coupled to the signal translating means and operative for suppressing the operation of the signal translating means. The suppressing means has a first input coupled to the line and is responsive to signals of the type produced by the aforementioned control signal generating means and received at each station for making the suppressing means operative. The suppressing means includes a second input coupled to the control signal generating means operative in response to the application of a signal thereto for making the suppressing means inoperative. With this arrangement, the suppressing means at any one of the stations is made ineffective upon the removal of the handset from the cradle at that station.

In order to make the control signal generating means at each station effective with respect to the suppressing means at all other stations, I provide means including a unidirectional gate at each subset for coupling the control signal generating means to the line. With this arrangement, a signal from the control signal generating means may be transferred from any one of the stations taken for use and effective for making the suppressing means at all other stations operative without interfering with the operation of the translating means within the station taken for use.

In the description of the preferred embodiment of my invention which follows, reference is made to the drawings attached to and forming a part of the present specification and in which.

Figure 1:
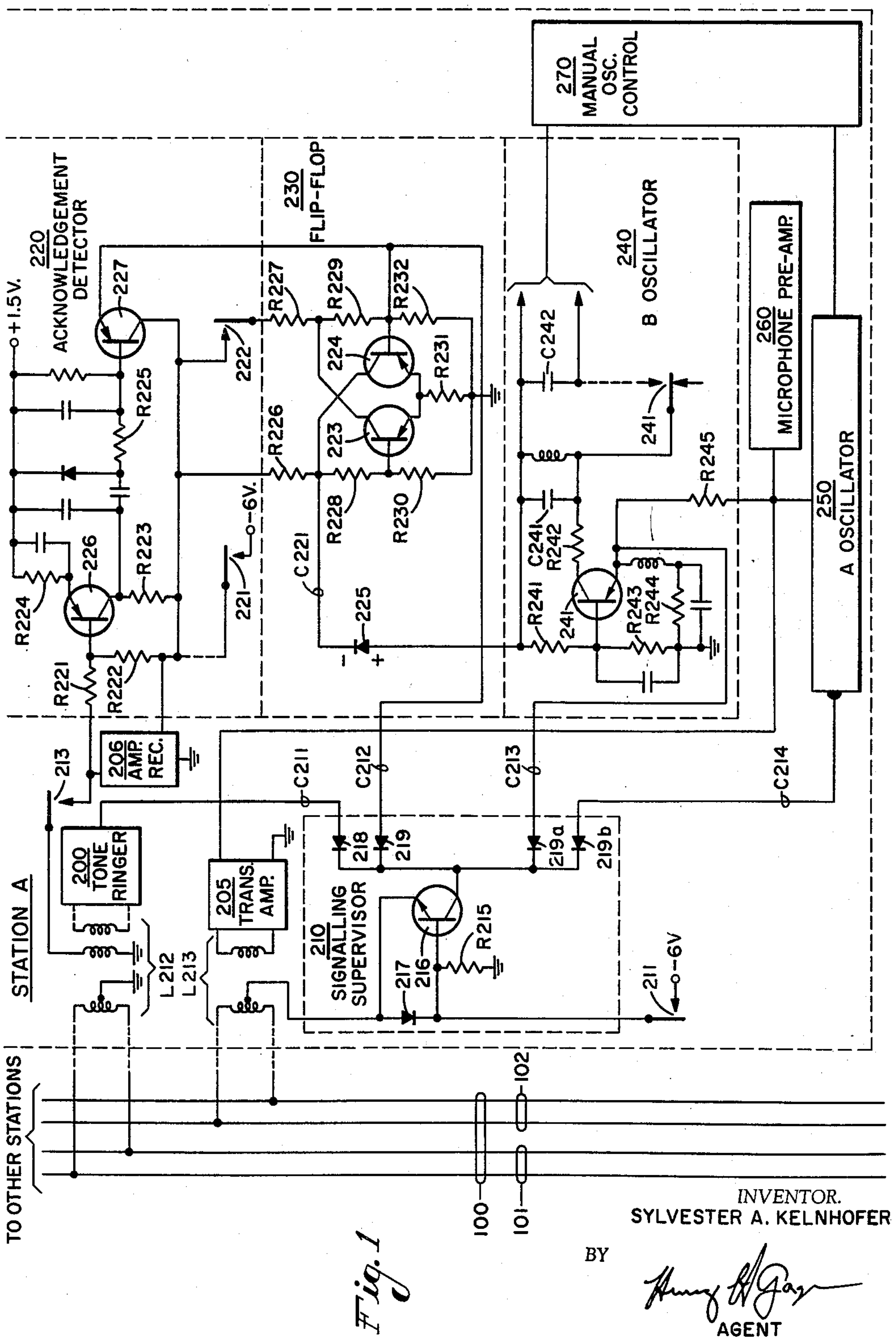
Fig. 1 shows a first station in skeletonized form.

In the preferred embodiment of my invention, a power source, such as first and second batteries, is provided at each station for driving the various elements to be described presently. The most positive plate or terminal of the first battery is connected to the chassis of the station apparatus and is hereinafter referred to in the description as "ground" and in the drawings by a conventional ground symbol; the most negative plate or terminal of this battery is connected to the apparatus as indicated in the drawings and is hereinafter referred to in the description as "−6 volt source" and in the drawings as "−6 v.". The second battery has its most negative plate or terminal connected to the above referred to chassis ground and is referred to in the same manner as the one described in connection with the first battery; the most positive plate or terminal of the second battery is hereinafter referred to in the description as "+1.5 v.",

*Description of the system*

Figure 2:
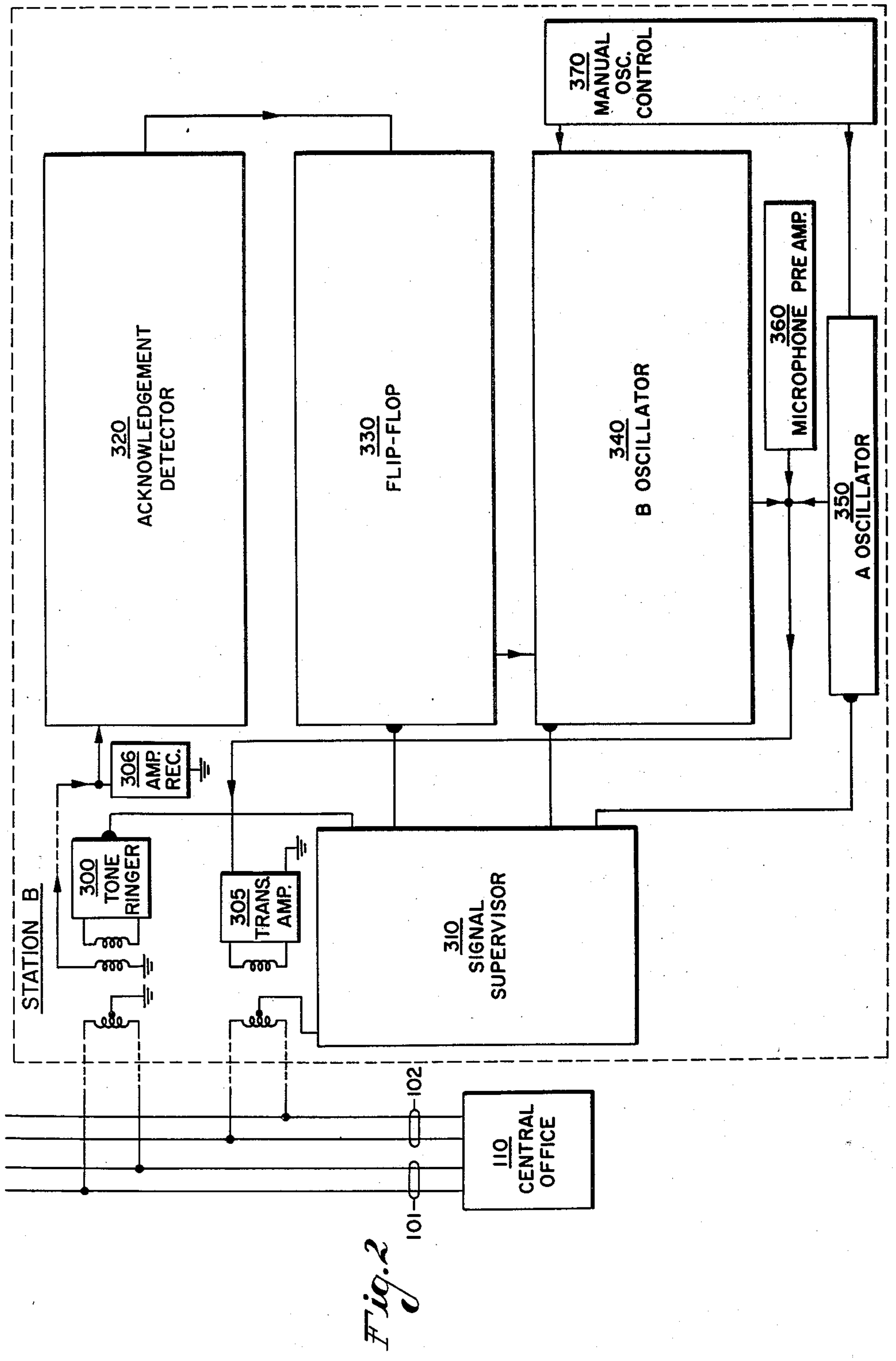
Fig. 2 shows a second station and a central office in block form.

Referring to the drawings aranged with the bottom of Fig. 1 adjacent to the bottom of Fig. 2 there is shown the preferred embodiment of my invention. I provide a line 100 comprising first and second wire pairs 101 and 102, respencetively. Pairs 101 and 102 constitute paths for receiving signals from and transmitting signals to, respectively, central office 110 from any one of a plurality of stations, such as A and B shown in Figs. 1 and 2, respectively. Pairs 101 and 102 are hereinafter referred to as the receive and transmit paths, respectively. While the preferred embodiment of my invention is made to function with the line or channel having separate paths for transmitting and receiving signals, it is to be understood that I do not limit my invention to such applications, and that it is possible to practice my invention with a conventional telephone or other line.

Central office 110 includes means (not shown) for transmitting and receiving signals over paths 101 and 102. This central office signal-receiving and -transmitting means does not form a part of the present invention, and therefore is not described in the following paragraphs except in terms of function.

Each of the aforementioned stations is substantially identical to all the others. Therefore the following description is made with specific reference to station A shown in Fig. 2, it being understood that each of the other stations includes corresponding apparatus capable of functioning in a manner substantially identical to the one described in connection with station A.

Station A includes means, such as microphone-preamplifier 260, for translating acoustical signals into electrical signals and means such as B oscillator 240 and A oscillator 250 in combination with manual oscillator control 270 for translating mechanical motions on the part of the station user such as removing the handset from its cradle into directive electrical signals. The output signals of the oscillators and preamplifier are coupled to line transmit path 102 by means including transmitting amplifier 205 and windings of coupling transformer 213.

Station A also includes means comprising tone ringer 200 coupled to the line receive path at least during the time that the station handset is on its cradle, and is operative in response to the receipt of signals from the office equipment transmitted over the receive path for indicating the presence of an incoming call to the station. Means including amplifier-receiver 206 is coupled to line receive path 101 in a manner to be set forth presently, and is operative for translating electrical signals from the line receive path into acoustical signals. Means including acknowledgment detector 230 is coupled to line receive path 101 and in parallel to amplifier-receiver 206. Acknowledgment detector 220 and tone ringer 200 are effective for translating signals incoming to station A into other electrical signals for reasons to be set forth.

A detailed description of the operation of preamplifier microphone 260, oscillators 240 and 250, manual oscillator control 270, tone ringer 200, amplifier-receiver 206, and acknowledgment detector 220 is set forth in the aforementioned patent application of Woodhull et al. Such detailed description is not repeated here except, as in the following paragraphs, for purposes of describing the present invention.

Station A is equipped with a conventional handset (not shown) which may carry a transducer portion of the amplifier-receiver 206 and the microphone portion of the microphone preamplifier 260. The handset cooperates with and is normally placed on a cradle. The cradle is mechanically linked by means not shown to a hookswitch mechanism which is not shown or described because such mechanical control is not a part of the present invention and is well understood by those skilled in the telephone art. The hookswitch mechanism is represented in Fig. 2 as individual contact sets shown in detached form. The individual contact sets within the hookswitch mechanism are operable by the aforementioned mechanical linkage to first (normal) and second (operated) conditions in response to the placement on and removal from the cradle of the telephone station. In Fig. 2, the contact sets are represented in the condition they occupy when the hookswitch mechanism is in normal condition.

If a call is to be answered or originated at station A, and it is assumed that no other station coupled to the line is in use at the time, accordingly the aforementioned handset at station A is removed from its cradle, thereby causing the hookswitch mechanism to be operated to its second condition in the above mentioned manner. The hookswitch mechanism is effective for coupling the inputs of acknowledgment detector 220 and amplifier-receiver 206 to line receive path 101 at make contacts 213 through the windings of coupling transformer L212. Operation of the hookswitch mechanism is effective for connecting the −6 volt source to the power inputs of amplifier-receiver 206 and acknowledgment detector 220 at now closed contacts 221 in order to make those devices operative.

Operation of the hookswitch contact mechanism is also effective for changing controlling means comprising flip-flop 230 from its normal condition to the first of two stable states, where PNP type transistor 223 is made conductive between its emitter and collector, by virtue of the sequential closing of hookswitch contact sets 221 and 222, sequential operation of the hookswitch mechanism being obtained by mechanical adjustment. Accordingly, closing contact set 221 connects the −6 volt source to the left-hand side of flip-flop 230 which includes serially connected resistors R226, R228, and R230. Under these conditions, the base of transistor 223 is made negative with respect to its emitter. When contact set 222 closes, the −6 volt source is connected to the collector of transistor 223 through resistor 227 of the serially connected resistors R227, R229 and R232 of the right-hand side of the flip-flop. The now forward-biased transistor 223 conducts between its emitter and collector and holds the base of transistor 224 positive with respect to its emitter, so that transistor 224 is nonconducting between its emitter and collector.

Flip-flop 230 functions as a switch between the −6 volt source and the power input of B oscillator 240. To this end, flip-flop 230, in the above-described first stable state, is effective for raising the negative potential applied to conductor C221 connected at the junction between resistors R226 and R228 to the point where diode 225 conducts. Therefore, the −6 volt source is effectively connected to the input of B oscillator 240 through resistor R226 and diode 225, and B oscillator 240 is operated to generate a seize signal with effects set forth below. Operation of the hookswitch mechanism, particularly the closing contact set 241, is effective for tuning B oscillator 240 to cause the latter to produce a seize signal at a predetermined frequency by connecting trimmer capacitor C242 in parallel with tank capacitor C241. The signal produced by oscillator 240 is coupled by means including resistor R245 to the input of transmitting amplifier 205, where the signal is amplified and applied to line transmit path 102 through the windings of coupling transformer L213.

Upon the receipt of the seize signal at office 110, means within office 110 sends an acknowledgment signal back to station A over line receive path 101. This acknowledgement signal is coupled to the input of detector 220 as previously described. The continued receipt of the acknowledgement signal at station A is effective for causing acknowledgement detector 220 to apply a forward biasing signal to the base of its own output transistor 227, so that transistor 227 becomes conductive between its emitter and collector and extends a connection from the −6 volt source through make contact set 221 to the junction between resistors R229 and R232 of the right-hand side and the base of PNP type transistor 224 of flip-flop 230.

Application of voltage from the −6 volt source to this point in flip-flop 230 is effective for changing flip-flop 230 from its first to its second stable state, with the result that flip-flop 230, functioning as a switch, effectively disconnects the −6 volt source from the input of B oscillator 240. To this end, connection of the −6 volt source to the base of transistor 224 in the above-described manner is effective to swing the base of that transistor negative with respect to its emitter. This forward-biasing of transistor 224 makes the transistor conductive between its emitter and collector. As a result, the voltage applied to conductor C221 becomes positive with respect to the positive plate of diode 225 and the voltage present on the base of transistor 223. Diode 225 ceases to conduct and under these conditions, shuts off the voltage supply to the input of B oscillator 240. Similarly, transistor 223 ceases to conduct between its emitter and collector because its base is now positive with respect to its emitter.

Upon the subsequent removal of the acknowledgement signal from line receive path 101 by the office 110 apparatus, and the resulting return of transistor 227 to its normal, nonconducting condition, flip-flop 230 remains in the above-described second stable state. Removal of voltage from its input makes B oscillator 240 stop generating the seize signal, so that the amplified seize signal is removed from line transmit path 102. Station A is now in condition to transmit and receive speech signals in the manner described by Woodhull et al. through the microphone and transducer portions of microphone preamplifier 260 and amplifier-receiver 206, respectively, as well as to transmit directive signals from A and B oscillators 250 and 240 under the control of manual oscillator control 270.

*Interstation signaling*

In a system of the above-described type where line 100 is used to couple a plurality of stations such as A and B to central office 110, the stations are also coupled in parallel to each other. It is therefore desirable when the line has been taken for use by one of the stations, such as A, to prevent other stations from interfering with the already established connection between station A and office 110. To this end, line 100 is used as a channel for transmitting local signals between stations, the local signals being non-interfering with the above-described speech, supervisory, and directive signals passing between the stations and office 110. In the preferred embodiment of my invention, interstation local signals are transmitted over a channel derived from the above-described transmit and receive paths 101 and 102 in the well-known simplex manner. The part of the signaling channel derived from path 101 is connected to ground of each station. The other part of the signaling channel, derived from path 102, is connected as indicated in the following paragraphs.

With the simplex arrangement, if conductors within each of paths 101 and 102 are balanced with respect to ground, alternating or direct current signals may be transmitted over the simplex channel without interfering with signals transmitted on the path conductors. It is pointed out, however, that in cases such as the one described above where alternating current signals are used exclusively in communicating between the stations and office 110 and the conductors of line 100 are not used for supplying power in the form of direct current from office 110 to the stations, non-interfering, direct current signals could be applied directly to conductors of either path 101 or 102.

In order to transmit local or inhibiting signals to other stations coupled to the line, each station, such as A, is equipped with means including the −6 volt source and hookswitch contacts 211 effective in response to the operation of the hookswitch mechanism for generating a −6 volt signal. This signal generating means is coupled by a unidirectional gate comprising diode 217 to the signaling channel derived from line paths 101 and 102 (i.e., at the center points of the left-hand windings of transformers L212 and L213).

Each station, such as A shown in Fig. 2, coupled to line 100 includes suppressing means, such as signaling suppressor 210, operative for preventing certain of the above-described devices including tone ringer 200, flip-flop 230, and A and B oscillators 250 and 240, from carrying out their signaling functions. For simplicity in a part of the description which follows, it is assumed that a station, such as B, has been taken for use and that the signal generating means in that station which corresponds to contacts 211 in station A has been operated, so that a local signal is sent in the above-described manner to the signaling suppressors of all other stations including 210 at station A. The operation of the suppressing means at station A is next described in detail.

The active elements in suppressor 210 include a transistor 216 and a plurality of blocking diodes, **218–219*b*, having their negative plates connected in parallel to each other and to the collector of transistor 216. A first input of signaling suppressor 210 couples the base and emitter of transistor 216 to the simplex signaling channel derived from line paths 101 and 102. Transistor 216 functions as a switch and is turned on, i.e., becomes conductive between its emitter and collector in response to the negative signals placed on the simplex channel derived from transmit path 102 because such signals make the base of transistor 216 positive with respect to its emitter. Transistor 216 in conducting state passes such negative signals through each of the plurality of blocking diodes 218—219*b* to the various output conductors C211—C214 of signaling suppressor 210**.

The output conductors C211—C214 are coupled to particular points within tone ringer 200, flip-flop 230, and A and B oscillators 250 and 240 at which a negative voltage is sufficient to prevent the operation of those devices. For instance, output conductor C213 is coupled to the emitter of transistor 241 within B oscillator 240, and the negative signal from line 100 forwarded through the suppressing means switch reverse-biases that PNP type transistor so long as the signal is received from line 100. Thereupon, B oscillator 240 is incapable of producing a signal of the seize type described above. A oscillator 250, which is a substantial duplicate of B oscillator 240, is similarly disabled. Tone ringer 200, which also includes an oscillator for generating an audible signal, is similarly disabled. Similarly, conductor C212 is coupled to the junction between resistors R228 and R230 of flip-flop 230, so that the negative inhibiting signal from the line forward-biases transistor 223, and thereby places flip-flop 230 in its previously described second stable state with the result that the flip-flop 230 effectively disconnects the −6 volt source from the above-described power input of B oscillator 240, if the flip-flop should be changed from its normal state by the removal of the handset from the station A cradle.

With signaling suppressor 210 in operated condition, removal of the handset from its cradle and the resulting operation of the hookswitch mechanism at station A now does not result in the automatic transmission of a seize signal from B oscillator 240. Further, when the handset is in place on its cradle, speech signals applied to tone ringer 200 at station A, which is coupled to line receive path 102 in the above-described manner, during the course of transmitting such signals from office 110 to station B, are ineffective for operating tone ringer 200, so that the incoming signal device at station A cannot be accidentally triggered by speech signals.

Having described how the signal generating means and signal suppressing means at each station operate, I next describe how the signal generating means at each station is made effective for making the suppressing means within the same station inoperative when that station is properly taken for use. As before, station A is taken as the specific example, it being understood that corresponding apparatus at each of the other stations functions in a substantially identical manner.

Assuming that the handset at station A has been removed from its cradle, and that all other stations are in idle condition, the signal genreating means including make contact set 211 is operated in the previously described manner. The signal generating means, in addition to being coupled in the above-described manner to the simplex signaling channel of line 100 is also coupled to a second input including diode 217 of signaling suppressor 210 across the base and emitter of transistor 216. Signals applied to the second input are effective for making the suppressing means including signaling suppressor 210 inoperative for the reasons next set forth.

Owing to the voltage drop in diode 217, the base of transistor 216 is thereby made negative with respect to its emitter by signals applied to the second input, so that the switch including transistor 216 is nonconductive between its emitter and collector. While transistor 216 is back-biased in this manner, the locally originating suppressing signals are not passed to the output conductors of signaling suppressor 210, so that the devices including tone ringer 200, flip-flop 230, and A and B oscillators 250 and 240 remain operable in the previously described manner.

While I have shown and described a specific embodiment of my invention, other modifications will readily occur to those skilled in the art. I do not, therefore, desire my invention to be limited to the specific arrangement shown and described, and I intend in the appended claims to cover all modifications within the scope and spirit of my invention.

What is claimed is:

1. In a communication system having a plurality of stations and a communication channel, the combination in each of said stations comprising: means operative for translating signals in the course of transmitting or receiving signals over said channel, means for generating a signal, means for coupling said generating means to said channel, suppressing means having a first input coupled to said channel and an output coupled to said translating means, said suppressing means being operative in response to the application of a signal to said first input for making said translating means inoperative, said suppressing means having a second input and being rendered inoperative in response to the application of a signal thereto, and means for coupling said signal generating means to said second input, whereby the operation of said signal generating means at any one of said stations is without effect on said signal translating means at the same one of said plurality of stations and effective to prevent the operation of said signal translating means at all other of said plurality of stations.

2. The communication system set forth in claim 1 wherein said means for coupling said signal generating means to said channel includes a unidirectional gate, and said means for coupling said signal generating means to said second input includes said unidirectional gate.

3. The communication system set forth in claim 2 wherein said signal generating means is effective for generating direct current signals, and said unidirectional gate comprises a diode.

4. In a communication system having a plurality of stations and a line including first and second channels, the combination in each of said stations comprising: means having an input normally operative for translating signals in the course of transmitting or receiving signals over said first channel, said translating means being rendered inoperative in response to the application of a signal to said input, means including a switch for coupling said translating means input to said second channel, means operative for generating a signal, said switch having first and second inputs coupled to said second channel and said signal generating means, respectively, said switch being closed and opened in response to the application of signals to said first and said second switch inputs, respectively, and a unidirectional gate for coupling said signal generating means to said second channel, whereby the operation of said signal generating means at any one of said stations is effective to prevent the operation of said translating means at all other of said plurality of stations while allowing said signal translating means at said any one station to remain operative.

5. The system set forth in claim 3 wherein said signal generating means is effective for generating direct current signals; and said unidirectional gate comprise a diode.

6. The communication system set forth in claim 5 wherein said signal translating means has a second input coupled to said first channel and is normally operative in response to signals received therefrom.

7. The communication system set forth in claim 5 wherein said signal translating means has an output coupled to said first channel and is normally operative to transmit signals thereto.

8. The communication system set forth in claim 7 and having in addition common means making said signal translating means and said signal generating means operative.

9. In a communication system having a plurality of stations and a line having first and second channels, the combination in each of said stations comprising: means operative for translating signals in the course of transmitting or receiving signals over said first channel; said translating means having an input and being rendered inoperative in response to the application of a direct current signal thereto; means operative for generating a direct current signal; a diode for coupling said signal generating means to said second channel; suppressing means including a transistor having an emitter, a collector, and a base; said suppressing means including a first input for coupling said base and said emitter to said second channel, a second input including said diode for coupling said base and said emitter to said signal generating means, and an output including said emitter and said collector for coupling said second channel to said signal translating means input; direct current signals received from said second channel applied to said first input being effective for forward-biasing said transistor in order to pass signals from said second channel to said signal translating means input; and said signal generating means being effective for applying signals to said second input to back-bias said transistor; whereby said signal translating means at any one of said plurality of stations having the operated one of said signal generating means remains operative, while said signal translating means at all others of said plurality of stations are suppressed.

10. In a telephone system having a plurality of stations and a line including first and second channels; the combination in each of said stations comprising: means operative for translating signals in the course of transmitting or receiving signals over said first channel; said translating means having an input and being rendered inoperative in response to the application of a signal thereto, means operative for generating a signal, means for coupling said signal generating means to said second channel; suppressing means having a first input coupled to said line and an output coupled to said translating means input, said suppressing means being operative in response to the application of a signal to said first input for preventing the operation of said signal translating means; said suppressing means having a second input coupled to said signal generating means and being made inoperative in response to the application of a signal thereto; and means including a manually controlled hookswitch mechanism operative in the course of making a call for operating said signal translating means and said signal generating means, in order to allow the operation of said signal translating means at the one of said plurality of stations having the operated one of said hookswitch means and to prevent the operation of said signal translating means at all other of said plurality of stations.

11. The telephone system set forth in claim 10 wherein said means for coupling said signal generating means to said second channel includes a unidirectional gate, and said means coupling said generating means to said second input includes said unidirectional gate.

12. The telephone system set forth in claim 11 wherein said signal generating means is effective for generating direct current signals and said unidirectional gate comprises a diode.

13. In a telephone system having a plurality of stations and a line having first and second channels, the combination in each of said stations comprising: means operative for translating signals in the course of transmitting or receiving signals over said first channel; said translating means having an input and being rendered inoperative in response to the application of a direct current signal thereto; means operative for generating a direct current signal; a diode for coupling said signal generating means to said second channel; suppressing means including a transistor having an emitter, a connector, and a base; said suppressing means having a first input for coupling said base and said emitter to said second channel, a second input including said diode for coupling said base and said emitter to said signal generating means, and an output including said emitter and said collector for coupling said second channel to said signal translating means input; direct current signals received from said second channel applied to said first input being effective for forward-biasing said transistor in order to pass signals from said second channel to said signal translating means input; said signal generating means being effective for applying signals to said second input to back-bias said transistor; and means including a manually controlled hookswitch mechanism operative in the course of making a call for operating said signal translating means and said signal generating means; whereby said signal translating means at any one of said plurality of stations having the operated one of said hookswitch mechanism means remains operative, while said signal translating means at all others of said plurality of stations are suppressed.

No references cited.